INVENTOR
MART E. DE TIENNE

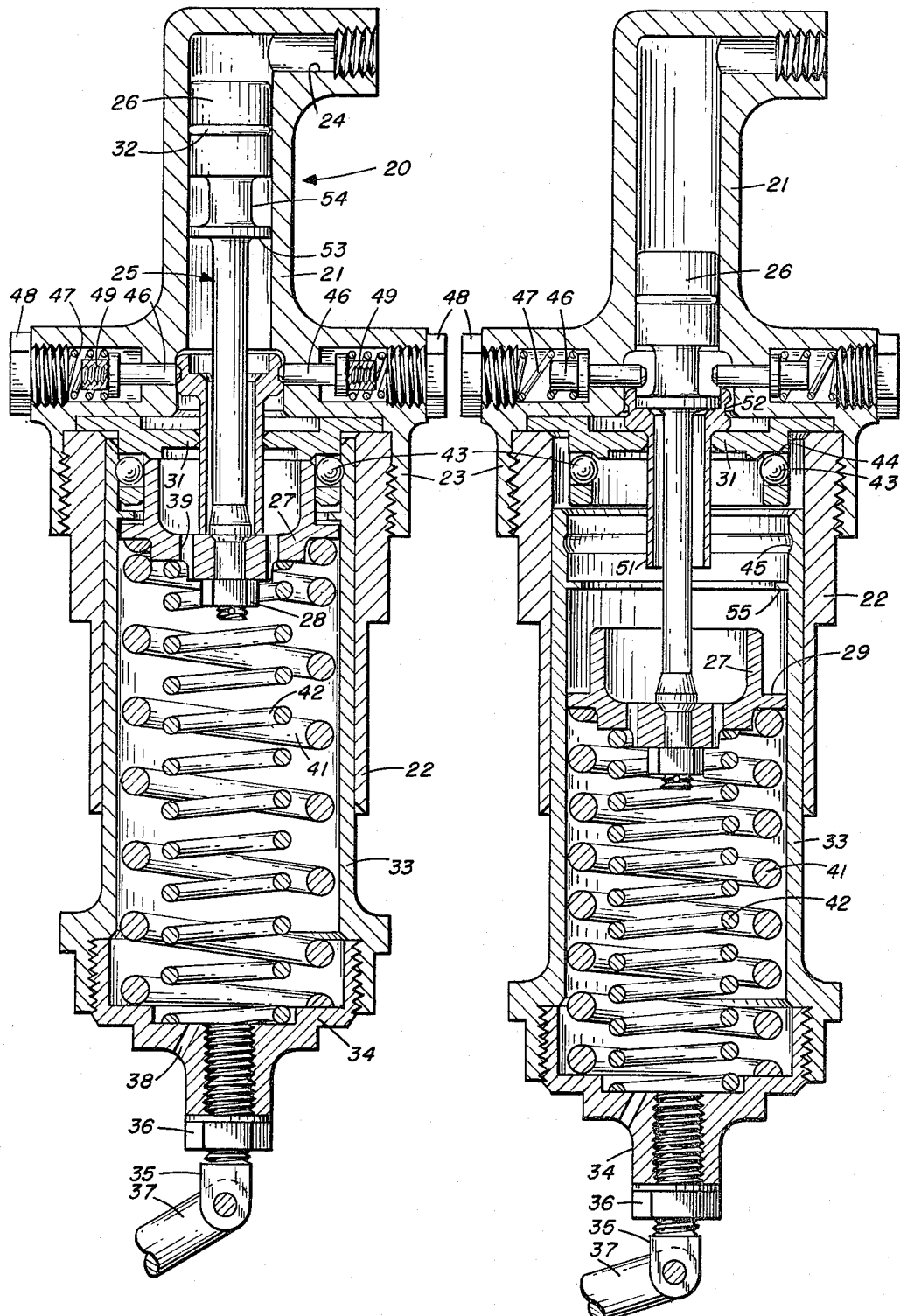

United States Patent Office 3,281,097
Patented Oct. 25, 1966

1

3,281,097
GAS OPERATED ENERGY STORING ACTUATOR
Mart E. De Tienne, St. Louis, Mo., assignor, by mesne assignments, to the United States of America as represented by the Secretary of the Navy
Filed Dec. 29, 1964, Ser. No. 422,103
2 Claims. (Cl. 244—122)

This invention relates generally to aircraft, and more particularly to an energy storing actuator used in an emergency seat ejection system.

Modern high performance aircraft typically utilize seat ejection systems for providing emergency escape capability for some or all of the aircraft crew. Examples of these seats are found in U.S. Patent Nos. 2,970,793 and 3,115,320. In dual seat aircraft, for example, it is customary to have independent controls for each ejection seat system. The novel energy storing actuator of this invention was developed for use in a dual seat ejection system wherein the ejection of one seat may be automatically sequenced from the initiation of ejection of the other seat. This sequential system retains, however, the independent seat ejection controls. The availability of such an automatically sequenced ejection feature would be beneficial in a number of situations. A crewman might be so incapacitated as to be unable to initiate his own ejection. Alternatively, a crewman might be unaware of an emergency so immediate as to preclude an adequate warning. In such situations, it would be desirable to eject the crewman automatically following the actuation of the pilot's ejection system.

As in any ejection system, it would be desirable in a sequenced system to delay the ejection of the crewman until his canopy had been jettisoned. Since the time lag between the initiation of the crewman's ejection system and the removal of the canopy is not necessarily a constant, it becomes necessary to provide a seat ejection actuator which is capable of storing the energy provided by the input signal from the pilot's ejection system until the crewman's canopy is actually jettisoned. Such an actuator has been unavailable heretofore.

Accordingly, it is the principal object of this invention to provide an actuator which is capable of storing the energy of the input signal for a variable time period and to utilize this stored energy to provide an output signal only after the occurrence of an independent event.

It is another object of this invention to provide an actuator which is capable of being tested repeatedly without the resulting necessity of disassembly to reset it.

It is a further object of this invention to provide an actuator which has a safety lock to prevent the accidental initiation of its action.

It is still another object of this invention to provide an energy storing actuator which is simple in construction and reliable in operation.

Other objects, advantages and novel features of the invention will become apparent from the following detailed description of the invention when considered in conjunction with the accompanying drawings wherein:

FIG. 2 is a cross-sectional view of the energy storing actuator of this invention shown in its normal position; and FIG. 3 is a cross-sectional view of the energy storing actuator in its cocked position.

Figure 1:
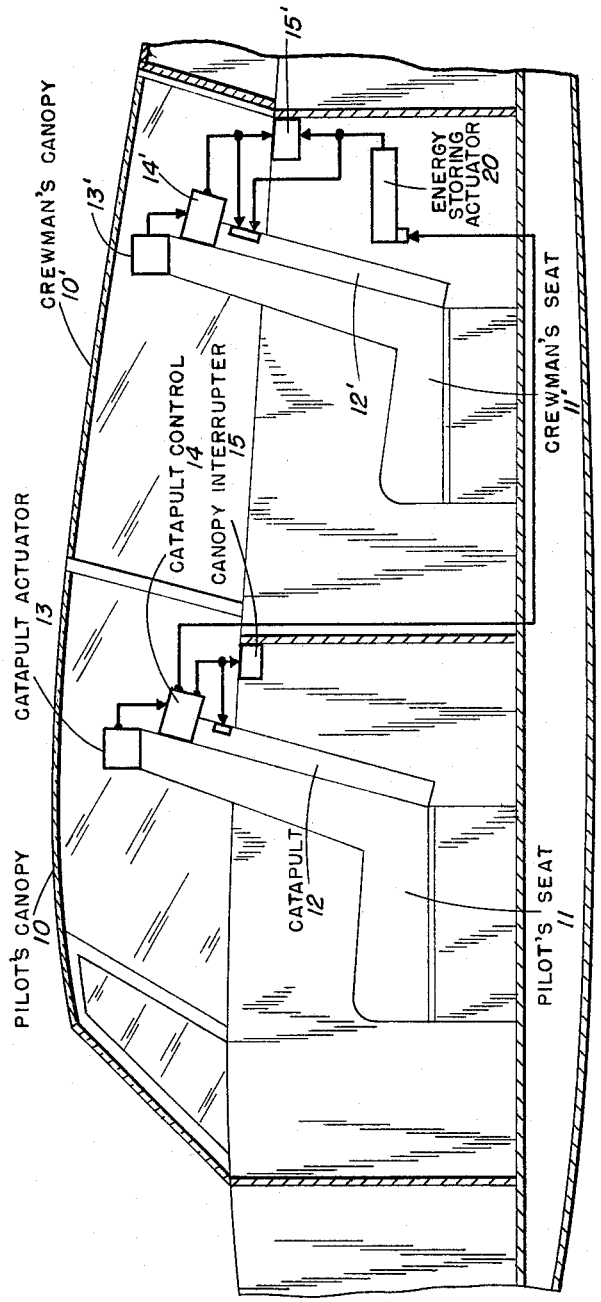
FIG. 1 is a schematic representation of an automatically sequenced ejection system which forms the environment of the instant invention.

Referring now to FIG. 1 of the drawings there is shown an aircraft cockpit incorporating a sequenced ejection system. In the illustrated embodiment, the cockpit is enclosed by a pilot's canopy 10 and a crewman's canopy 10'. This invention could alternatively be utilized in a two-seat cockpit which was covered by a single integral canopy, or in an aircraft having ejection seats for a plurality of crewmen. The following description of FIG. 1 is directed to the structure associated with the pilot's ejection seat 11, it being understood that corresponding structure indicated by primed numerals is utilized with the crewman's ejection seat. The ejection of seat 11 is accomplished by means of a catapult indicated generally at 12. The ejection procedure is initiated by a catapult actuator generally indicated at 13. The actuator communicates with a catapult control generally illustrated at 14. The cooperation and communication between the various assemblies of the illustrated ejection system is indicated by flow lines, with the direction of the communicating signal being indicated by the arrowheads. A canopy interrupter 15, which may be constructed in the manner illustrated and described in U.S. Patent No. 2,971,729, serves to prevent the actuation of the catapult until the canopy 10 has been jettisoned.

The novel energy storing actuator of this invention is indicated generally at 20. It receives its input signal from the pilot's catapult control 14. In the illustrated embodiment, this signal comprises a pressurized gas which is generated by the initiation of the pilot's ejection procedure. Alternatively, a mechanical linkage or solenoid could be utilized. Actuator 20 initiates the ejection of the crewman's seat by means of catapult 12' as soon as canopy interrupter 15' indicates that the crewman's canopy 10' has left the aircraft. As is shown in FIG. 1, the above described actuating system is alternative to the crewman's independent control provided by actuator 13' and control 14'.

The details of energy storing actuator 20 are illustrated in FIGS. 2 and 3. The actuator 20 comprises a housing having an upper portion 21 and a lower portion 22, which are assembled by means of threads 23. Port 24 is provided in housing 21 and serves as an inlet for pressurized gas emanating from the pilot's catapult control 14.

Piston assembly 25 is reciprocally mounted in housing 21, 22, and comprises an upper portion 26 and a lower portion 27 held together by means of nut 28. An annular plate 31 serves to limit both the upward and lower movement of piston assembly 25. A gasket or O-ring 32 on piston 26 provides a pressure seal between the piston and the bore of housing 21.

Sleeve 33 is reciprocally mounted in housing 22. The lower portion of sleeve 33 is closed by externally threaded nut 34. A bolt 35 is held in place in nut 34 by means of nut 36 and serves as the output element of actuator 20. Bolt 35 may be connected through appropriate linkage, indicated by reference numeral 37 in FIG. 2 and illustrated schematically in FIG. 1, to catapult 12' and canopy interrupter 15'. Port 38 in nut 34 permits air to pass to and from the chamber defined by sleeve 33 and piston 27, while port 39 serves a similar purpose with respect to the chambers on each side of piston 27. Compression springs 41 and 42 are placed between piston 27 and nut 34 and bias these elements apart.

Detent balls 43 are retained in slot 44 in plate 31 by means of a reduced slot width portion at the inner edge of slot 44. Balls 43 are thereby prevented from falling inwardly into the sleeve 33. An annular recess 45 is provided in housing 33 to receive a portion of balls 43 when actuator 20 is in the position shown in FIG. 2. The purpose of these balls will be described hereinafter.

A pair of locking pins 46 located in housing 21 are biased inwardly by means of compression springs 47, which seat against plugs 48. Pins 46 are provided with an internal thread 49 to assist in removing the pins from the assembly. When the actuator is in the position shown in FIG. 2, pins 46 are retained by means of retainer 51, which has a groove 52 adapted to receive the inner end of pins 46. As piston assembly 25 moves downwardly, shoulder 53 contacts retainer 51, pushing it downwardly and camming pins 46 outwardly against the compression of springs 47. Travel of piston 25 ceases when retainer 51 abuts plate 31. At this time the upper edge of retainer 51 is below pins 46, and the pins are then free to travel inwardly under the action of springs 47 into recess 54 of piston assembly 25. In this position, locking pins 46 prevent upward movement of the piston assembly 25.

It should be noted that when the actuator is in the position illustrated in FIG. 2 it is impossible to move sleeve 33. Sleeve 33 is locked to plate 31 because the balls 43 are wedged between piston 27 and recess 45. Thus, accidental actuation of the crewman's ejection seat is prevented, since sleeve 33 cannot be moved until piston 27 has traveled downwardly a sufficient distance to uncover slot 44 and thereby permit the balls 43 to be cammed out of recess 45 and into the position shown in FIG. 3. It is contemplated that springs 41 and 42 would be under slight compression, so as to maintain piston 27 in the position shown in FIG. 2, and thereby assure that balls 43 stay in recess 45 until actuation of the system.

In operation, when the pilot initiates his ejection system, pressurized gas emanating from catapult control 14 is admitted to actuator 20 through port 24. This gas acting on piston 26 drives piston assembly 25 downwardly. The motion of piston 27 is transmitted to sleeve 33 by means of compression springs 41 and 42 as soon as piston 27 uncovers slots 44. Travel of sleeve 33 is transmitted through linkage 37 until the canopy interrupter 15' prevents further movement of the linkage. Piston assembly 25 will continue to move downwardly under the action of the pressurized gas, thereby compressing springs 41 and 42. Shoulder 53 of piston assembly 25 will impinge against retainer 51, pushing it downwardly until retainer 51 abuts stop plate 31. At this time the locking pins 46 will be pushed inwardly into recess 54 by compression springs 47, thereby preventing upward movement of piston assembly 25 should the pressurized gas signal lose strength. Actuator 20 will then be in the cocked position shown in FIG. 3. As soon as the crewman's canopy 10' is jettisoned from the aircraft, canopy interrupter 15' will permit motion of linkage 37 to resume. This motion results from the energy stored in compressed springs 41 and 42, and will result in the actuation of the crewman's catapult. Sleeve 33 is limited in its downward stroke by the annular projection 55 on the interior of sleeve 33 striking the surface 29 of piston 27. Thus if linkage 37 were removed, sleeve 33 and springs 41 and 42 would be retained in actuator 20 upon the completion of the stroking of sleeve 33.

It is thus seen that accidental operation of actuator 20 is prevented by means of the combination of detent balls 43 and compression springs 41 and 42. The use of the detent balls, rather than a device such as a shear pin, is advantageous in that it permits actuator 20 to be tested with air pressure without the necessity of replacement of parts after the test.

To ready actuator 20 for stroking following actuation, plugs 48 are removed so that pins 46 may be withdrawn sufficiently to allow retainer 51 to be repositioned as in FIG. 2. Pushing upward on nut 34 will reposition pistons 25 and 27, sleeve 33 and detent balls 43 as shown in FIG. 2.

The use of the unique actuator of this invention permits the energy of the input signal to be stored in the compressed springs, and to be released only after the occurrence of an independent event, which in this case is the jettisoning of the crewman's canopy. Thus, in the event the pressurized gas signal decreases in magnitude, the actuator, once cocked, will have sufficient stored energy to properly complete the ejection when the canopy is jettisoned.

Obviously many modifications and variations of the present invention are possible in the light of the above teachings. It is therefore to be understood that within the scope of the appended claims the invention may be practiced otherwise than as specifically described.

What is claimed is:
1. An energy storing actuator comprising:
   housing means;
   input means reciprocally mounted in said housing for axial displacement in response to an initiating signal;
   output means reciprocally mounted in said housing;
   latch means responsive to the occurrence of a predetermined displacement of said input means to maintain said input means in displaced position;
   resilient means disposed between said input means and said output means and biasing them apart; and
   limiting means for restricting movement of said output means, said limiting means releasing said output means in response to the occurrence of an independent event;
   whereby the displacement and latching of said input means in response to said initiating signal compresses said resilient means to store energy therein, and release of said limiting means in response to the occurrence of said independent event allows movement of said output means away from said input means in response to the biasing of said resilient means.
2. In a catapult type seat ejection system for a dual seat aircraft comprising independent seat ejection controls for actuating the respective seat ejection catapults and an alternative control for automatically sequencing the actuation of the second seat catapult following the actuation of the first seat catapult, and further comprising canopy interlocks to prevent seat ejection until the associated aircraft canopy is jettisoned, the improvement which comprises an energy storing actuator for the second ejection seat comprising:
   housing means;
   input means, responsive to a signal generated by the actuation of the first seat catapult, mounted for reciprocation within said housing means;
   output means mounted for reciprocation within said housing means and connected to the second seat catapult and canopy interlock;
   resilient means disposed between said input means and said output means and biasing them apart;
   lock means cooperating with said input means, said output means, and said housing means for preventing movement of said output means until the completion of a predetermined portion of the stroke of said input means; and
   latch means for limiting the length of stroke of said input means and for preventing return movement of said input means after the completion of its stroke;
   whereby actuation of the first seat catapult initiates the input stroke of the energy storing actuator input means, the motion of which is communicated through said resilient means to said output means, movement of the output means continuing until blocked by the second seat canopy interlock, whereupon said resilient means and said latch means cooperate to store energy created by the continued stroke of said input means, and releases said energy to said output means to actuate the second seat catapult upon the jettisoning of the second seat canopy.

References Cited by the Examiner
UNITED STATES PATENTS

| | | | |
|---|---|---|---|
| 2,925,011 | 2/1960 | Musser et al. | 244—122 X |
| 3,145,494 | 8/1964 | Wilcox et al. | 89—1 X |
| 3,185,148 | 5/1965 | Gaylord | 244—122 X |

MILTON BUCHLER, *Primary Examiner.*

B. BELKIN, *Assistant Examiner.*